Patented Nov. 5, 1946

2,410,699

UNITED STATES PATENT OFFICE 2,410,699

CYCLOTRIMETHYLENETRINITRAMINE RECOVERY

Joseph A. Wyler, Allentown, Pa., assignor to Trojan Powder Company, Allentown, Pa.

No Drawing. Application September 26, 1942, Serial No. 459,839

3 Claims. (Cl. 260—248)

This invention relates in general to a process for the recovery of cyclo-trimethylenetrinitramine from mixtures comprising cyclo-trimethylenetrinitramine and nitrotoluenes, and more particularly to the recovery of cyclo-trimethylenetrinitramine from mixtures of cyclo-trimethylenetrinitramine and trinitrotoluene.

The principal object of my invention is to recover both the cyclo-trimethylenetrinitramine and the nitrotoluenes in valuable forms from the various types of ammunition used in warfare, in which cyclo-trimethylenetrinitramine is in intimate contact with trinitrotoluene, dinitrotoluene, or mononitrotoluene or with any of these nitrotoluenes and conditioning agents as paraffin, graphite, alkali stearates, waxes and the like.

At the present time mixtures of cyclo-trimethylenetrinitramine and trinitrotoluene are being used in anti-aircraft shells, torpedoes, anti-submarine bombs and for certain small-sized artillery pieces. These various compositions are amenable to my process. Also, mixtures of cyclo-trimethylenetrinitramine, trinitrotoluene, aluminum and ammonium nitrate which are useful in bombs may advantageously be subjected to my process.

I have discovered that if an acetone solution of cyclo-trimethylenetrinitramine and a nitrotoluene is slowly treated with water, with thorough agitation of the mixture, that the cyclo-trimethylenetrinitramine is the first to separate. If the water is added cautiously and the stirring made very turbulent the cyclo-trimethylenetrinitramine will separate in a high state of purity and in an excellent physical condition. The continued addition of the water causes the further precipitation of the cyclo-trimethylenetrinitramine and finally, as more water is added, an oil-like product, instead of a crystalline, separates. Just before this stage is reached it is best to filter off the cyclo-trimethylenetrinitramine crystals in order to prevent their contamination by this oily product which is mainly a nitrotoluene-acetone-water phase. In such cases where a small amount of this oily layer does separate the effect upon the purity of the precipitated cyclo-trimethylenetrinitramine is negligible because this oily layer passes through the filter. The filtrate from the cyclo-trimethylenetrinitramine is treated with a large excess of water in the same manner as described above and the precipitated nitrotoluene separted by any suitable method, as filtration for the trinitrotoluene and dinitrotoluene and settling for the mononitrotoluene.

In order to more clearly point out my invention, the following examples, in which all parts are by weight, are given.

Example 1

100 parts of a 50-50 mixture of cyclo-trimethylenetrinitramine and trinitrotoluene were dissolved in 560 parts of acetone at room temperature, the mixture filtered to remove any insoluble foreign matter and the clear solution treated with water, added in a thin stream while the mixture was being stirred vigorously. When about 450 parts of water had been added, the water-addition was discontinued and the mixture stirred for half an hour or more additional. The mixture was filtered and the cyclo-trimethylenetrinitramine which had separated, washed on the filter with aqueous acetone (1-1), followed by water and dried. The weight of cyclo-trimethylenetrinitramine obtained was 47 parts.

The filtrate obtained as just described was treated with an excess of water, with stirring. This precipitated the trinitrotoluene together with a small amount of cyclo-trimethylenetrinitramine. The mixture was filtered and the residue on the filter washer with water and dried. The weight of this residue, which was fairly pure trinitrotoluene, was 53 parts.

Example 2

100 parts of a 50-50 mixture of cyclo-trimethylenetrinitramine and trinitrotoluene were dissolved in 400 parts of acetone at 45° C. and this mixture treated with water, at about 45° C., in essentially the same manner as described above. In the present case about 375 parts of water were used to cause the separation of the cyclo-trimethylenetrinitramine. The yield of the latter was 49 parts.

Upon dilution and stirring of the filtrate with an excess of water the trinitrotoluene separated in a yield of 51 parts of the dried material.

Similarly, I may effect a separation of cyclo-trimethylenetrinitramine from admixture with dinitrotoluene or mononitrotoluene and it is to be understood that my process is applicable to mixtures comprising cyclo-trimethylenetrinitramine and nitrotoluenes in which the cyclo-trimethylenetrinitramine content varies from a predominant proportion to a minor proportion. Consequently, it will be clear to a person skilled in this art that I may vary considerably the proportion of acetone used to the weight of the mixture of cyclo-trimethylenetrinitramine and nitrotoluene being treated and also the amount of water used for the precipitations, the essential operations being that the water is properly added and that the maximum amount of water added is regulated by observing the beginning of the formation of a liquid phase as described above.

Although I prefer to use temperatures of about 25–30° C. for the precipitation, temperatures as high as 60° C. are entirely practicable, particularly with the trinitrotoluene-cyclo-trimethylenetrinitramine mixtures.

I claim:

1. The process for the recovery of cyclo-trimethylenetrinitramine from mixtures comprising essentially cyclo-trimethylenetrinitramine and a nitrotoluene which comprises treating such a mixture with an amount of acetone which is sufficient to dissolve the cyclo-trimethylenetrinitramine and the nitrotoluene, filtering, adding water slowly and in such an amount to the filtrate, with stirring, to effect the substantial precipiation of the cyclo-trimethylenetrinitramine without the precipitation of any appreciable amount of a nitrotoluene from the solution and filtering off the precipitated cyclo-trimethylenetrinitramine.

2. The process for the recovery of cyclo-trimethylenetrinitramine from mixtures comprising essentially cyclo-trimethylenetrinitramine and trinitrotoluene, which comprises treating such a mixture with an amount of acetone which is sufficient to dissolve the cyclo-trimethylenetrinitramine and the trinitrotoluene, filtering, adding water slowly and in such an amount to the filtrate, with stirring, to effect the substantial precipitation of the cyclo-trimethylene trinitramine without the precipitation of any appreciable amount of trinitrotoluene from the solution and filtering off the precipitated cyclo-trimethylenetrinitramine.

3. The process for the recovery of cyclo-trimethylenetrinitramine from a mixture comprising about 1 part of cyclo-trimethylenetrinitramine to 1 part of trinitrotoluene which comprises dissolving about 1 part of said mixture in about 6 parts of acetone, filtering, slowly adding about 4.5 parts of water, with thorough stirring, filtering off the precipitated cyclo-trimethylenetrinitramine, washing the latter with dilute acetone, then with water and drying.

JOSEPH A. WYLER.